United States Patent [19]

Goodwin

[11] Patent Number: 4,981,104

[45] Date of Patent: Jan. 1, 1991

[54] DISPOSABLE FLEA REPELLANT KITTY LITTER BOX

[76] Inventor: Ida H. Goodwin, 338 Fiesta St., Santa Fe, N. Mex. 87501

[21] Appl. No.: 488,265

[22] Filed: Mar. 5, 1990

[51] Int. Cl.$^5$ .................. A01K 29/00; A01K 13/00
[52] U.S. Cl. .................................. 119/168; 119/157
[58] Field of Search ......................... 119/1, 157, 159

[56] References Cited

U.S. PATENT DOCUMENTS

| | | | |
|---|---|---|---|
| 69,376 | 10/1867 | Walton | 119/1 X |
| D. 230,285 | 2/1974 | Dilley | 119/1 X |
| 3,016,042 | 1/1962 | Curn, Jr. | 119/19 |
| 3,085,550 | 4/1963 | Crawford | 119/1 |
| 3,890,930 | 6/1975 | Clark | 119/1 |
| 3,941,090 | 3/1976 | Fry | 119/1 |
| 4,348,982 | 9/1982 | Selby | 119/1 |
| 4,664,064 | 5/1987 | Lowe | 119/1 |
| 4,787,335 | 11/1988 | Carlyon | 119/1 |
| 4,792,082 | 12/1988 | Williamson | 119/1 X |
| 4,800,842 | 1/1989 | Jones, Jr. | 119/1 |
| 4,884,527 | 12/1989 | Skirvin | 119/1 |

FOREIGN PATENT DOCUMENTS 2618050  1/1989  France ................................. 119/1

OTHER PUBLICATIONS

L. L. Bean Catalog (1988 Full Weekend Specialties), p. 77.

Primary Examiner—Robert P. Swiatek
Assistant Examiner—Todd E. Manahan
Attorney, Agent, or Firm—Robert W. Harris

[57] ABSTRACT

A disposable kitty litter tent with a moisture-resistant cardboard base and a paper tent which may be folded flat against the base for shipment and sale, which also performs deodorizing and flea repellant functions, by use of a thin layer of cedar sawdust secured to the inner walls of the tent by the mild adhesive. The cedar sawdust deodorizes the kitty litter tent against odors generated by cat wastes. The cedar sawdust also gradually rubs off against the cat's fur as the cat moves within the tent, particularly when the cat turns around to exit the single opening in one end of the tent, so that the cat receives a flea repellant benefit even when away from the tent, from the thin layer of cedar sawdust which accumulates upon its fur.

11 Claims, 2 Drawing Sheets

4,981,104

DISPOSABLE FLEA REPELLANT KITTY LITTER BOX

BACKGROUND OF THE INVENTION

The invention pertains to cat sanitary stations used to hold cat litter, and more particularly to such products which are made of inexpensive materials and intended to be disposable after a brief period of use.

Although disposable pet sanitary stations are known in the art, as for example in U.S. Pat. No. 4,800,842 of Jones, Jr., it is desirable to provide a disposable sanitary station which also provides means to control the odor which is naturally associated with such a station, due to the accumulation of animal wastes within the station. It is also desirable to provide a means within such a station which will automatically apply a flea repellant substance to the fur of the cat or other animal using the station, so that the animal would receive a flea repellant benefit even when away from the station. And it would be desirable to employ a natural substance for such flea repellant purposes, rather than some complex artificial chemical compound which might possibly have harmful long term health effects on the animal.

The present invention accomplishes both the odor suppressing and flea repellant functions by very simple means which automatically apply to the fur of the animal a thin coating of cedar sawdust. Although cedar has been known in the art as having both flea repellant and odor suppressant properties, and cedar shavings have been used as filling in dog beds, it does not appear that cedar sawdust has been used in a pet sanitary station, or in a product which applies a thin coating of the material to the animal's fur.

SUMMARY OF THE INVENTION

The invention comprises a base containing the animal litter; a pet toilet compartment attached to the base, disposed at least primarily above the base, having an opening of sufficient size to allow ingress and engress of the type of pet for whom the station is intended, and further having folding and erection means whereby the pet toilet compartment may be either folded flat onto the top of the base for transport, sale or storage, or erected into an upright position above the base for use by the pet. The pet toilet compartment also contains a means for automatically applying to the surface of the body of a pet using the invention, a thin coating of a deodorizing and flea repellant substance.

In the preferred embodiment, the base is a shallow moisture-resistant cardboard box, and the pet toilet compartment is a tent-shaped structure made of reasonably stiff paper, capable of standing alone when erected into the operational position. The tent has pre-creased fold lines, and a paper handle on top, as a means whereby the tent may be either folded down onto the base for shipment, storage and sale, or lifted up into an erect position, for use by the pet. The tent is closed on the ends except for an opening flap which is folded upward to form a doorway for the pet. The inner surface of the tent has a thin layer of a mild adhesive upon which has been deposited a thin layer of cedar sawdust, which acts as a deodorizing and flea repellant agent. The tent shape and cedar sawdust layer together function as a means to automatically apply a thin layer of cedar sawdust to the pet's fur as it moves within the tent, so that the pet will have the benefit of the flea repellant property of the cedar when it is away from the tent.

One purpose of the present invention is to provide an inexpensive, disposable pet sanitary station, of simple construction, for holding pet litter.

Another purpose is to provide such a product which also automatically tends to suppress the odor which naturally tends to accompany the accumulation of animal wastes within such a sanitary station.

Another purpose of the invention is to provide such an odor suppressing means which also serves a flea repellant function.

Yet another purpose of the invention is to provide a means for automatically applying a thin coating of flea repellant substance to the surface of the pet's body, so that the pet will have the benefit of the flea repellant not only when at the sanitary station, but also when away from the station.

BRIEF DESCRIPTION OF THE DRAWINGS

In the drawings, which all refer to the same preferred embodiment.

DESCRIPTION OF THE PREFERRED EMBODIMENT

Figure 1:
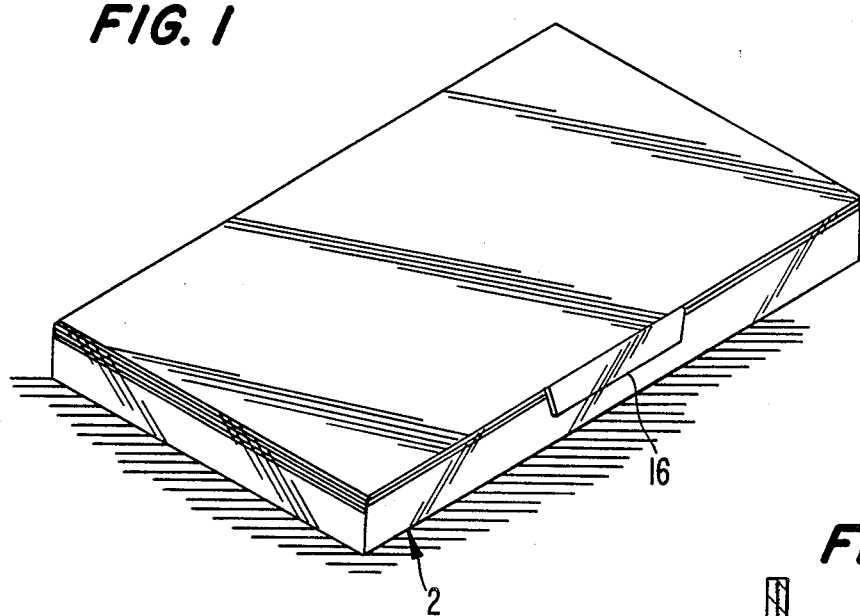
FIG. 1 is a perspective view of the configuration in which the tent is folded for shipment and sale.
Figure 4:
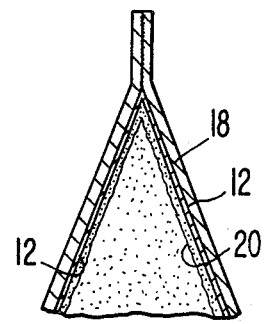
FIG. 4 is an expanded view of the upper portion of FIG. 3, enclosed within the dashed circle labelled 4 in FIG. 3.
Figure 2:
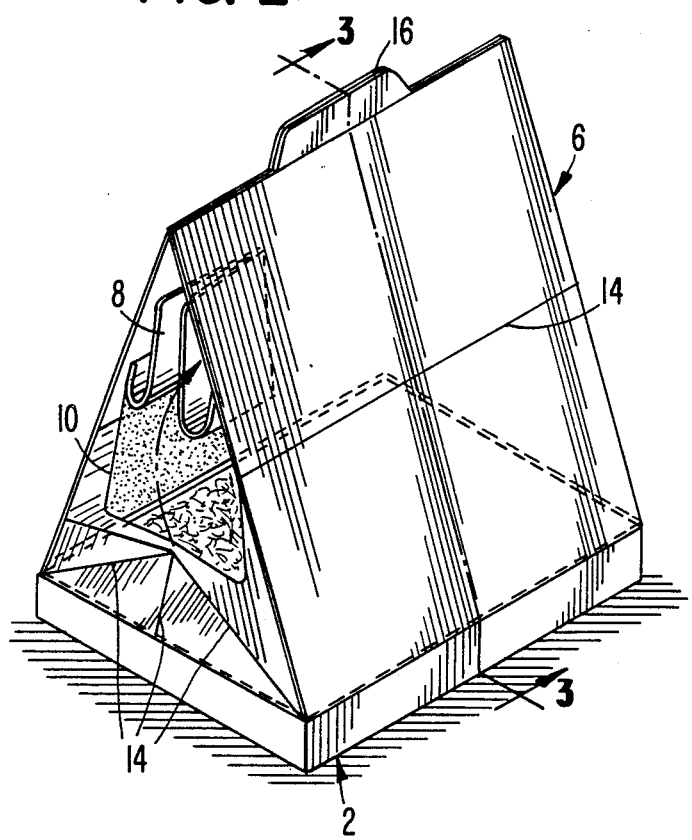
FIG. 2 is a perspective view with the tent in the erected configuration for use by a pet.

Referring now to the drawings, wherein like reference numbers denote like or corresponding parts, the preferred embodiment has a base 2, which is a shallow cardboard box having a rectangular bottom with one dimension longer than the other, thus having a principal longitudinal axis which is the line bisecting the two shorter ends of the base. The base 2 contains conventional cat litter 4. In order to prevent liquid pet waste from penetrating the walls of the base 2, for any such liquid waste which reaches the bottom of the cat litter 4, the interior surface of base 2 may be treated with a water resistant plastic or similar coating material, in a manner well known in the art.

Figure 3:
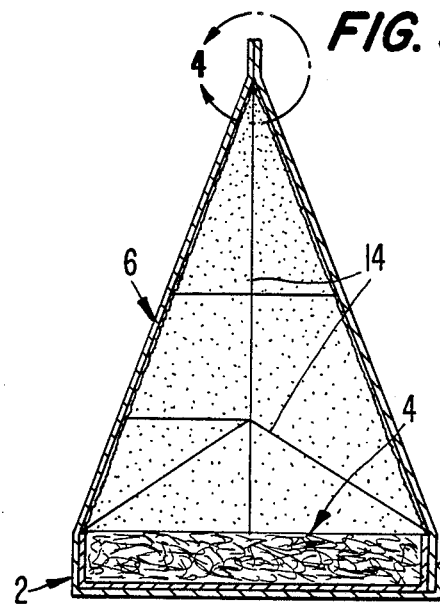
FIG. 3 is a vertical section as indicated by the section lines 3—3 of FIG. 2.
Figures 5, 6:
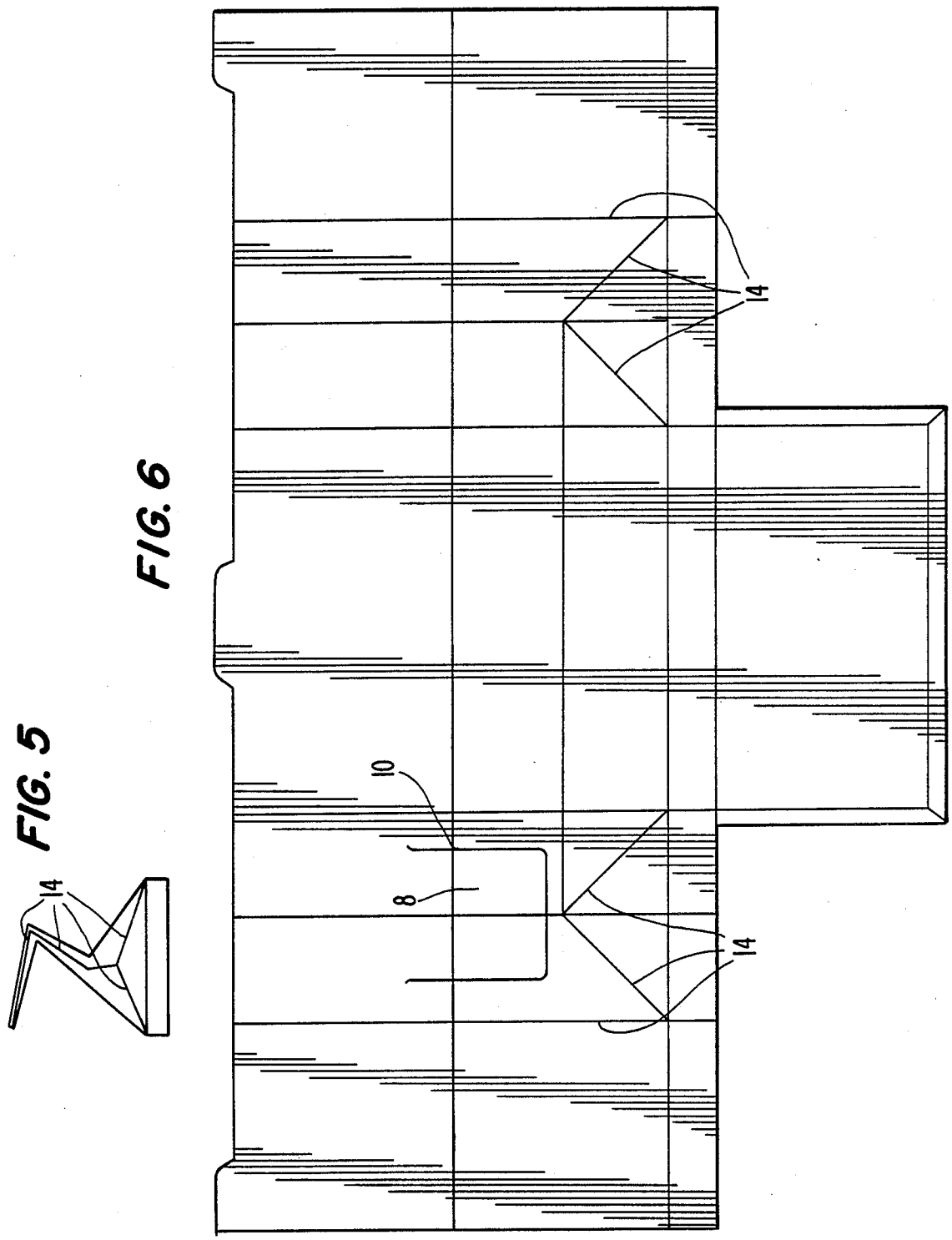
FIG. 5 is an end view showing the preferred embodiment in a partially folded configuration.
FIG. 6 is a plan view showning the tent of the preferred embodiment opened up and folded completely flat.

Attached to the top of the base 2 is a tent 6, which is the pet toilet compartment of the preferred embodiment. The tent 6 is formed of a reasonably stiff paper, such that tent 6 is able to stand erect in operation, without other support. The tent 6 may be attached to base 2 by means of a suitable adhesive, by means of staples, or in any other convenient manner. The tent 6 has a conventional tent shape, with a cross section (in a direction perpendicular to the principal longitudinal axis of the base, as in FIG. 3) of the form of an inverted "V", and is closed at the ends, except for an entry flap 8 at one end thereof. The entry flap 8 is formed by a cut 10 in one end of tent 6, the cut 10 having substantially the shape of a flat-bottomed "U". By folding up the entry flap 8, the portion of the end wall of tent 6 within entry flap 8 may be opened to allow ingress and egress of the cat wishing to use the sanitary station. Obviously the dimensions of entry flap 8, and the height and width of tent 6, must be of sufficient size to accommodate cats of interest. However, the width and height of tent 6 should be of a size small enough that a cat moving about within the tent 6 will tend to rub its fur against the inner walls 12 of tent 6, for reasons explained below.

The present invention may, of course, be fabricated in various sizes to accommodate cats of various sizes.

The tent 6 has pre-creased fold lines 14 on the ends and sides thereof, so that tent 6 may be pushed down and folded flat onto the top of base 2, when the invention is to be packaged for shipment and sale. In this configuration the entire invention may be wrapped in a shipping and display package (not shown), which is removed after purchase when the invention is to be put into actual use. A cardboard or stiff paper handle 16 is attached to the top central portion of tent 6 by means of an adhesive or staples. After the invention is removed from the shipment/display package, the owner may prepare the invention for use by simply lifting upward on handle 16, and thereby erecting tent 6 into an upright position. To complete preparation for use, the owner need only fold the entry flap 8 upward within the interior of tent 6, wedging the outer edges of entry flap 8 against the inner walls 12 of tent 6, to secure entry flap 8 in the raised position, so that the cat may enter and leave tent 6 through the opening thus formed in the end of tent 6.

The inner walls 12 of tent 6 are coated with a thin adhesive coating 18. The adhesive coating 18 is used to secure a thin cedar sawdust layer 20 to the inner walls 12 of tent 6, by applying the cedar sawdust layer 20 to the surface of adhesive coating 18. The adhesive chosen for adhesive coating 18 is a mild strength adhesive, which is sufficiently strong to hold the thin cedar sawdust layer 20 on the inner walls 12 of tent 6, while yet allowing the cedar sawdust to gradually rub off onto the cat's fur as the animal rubs against the inner walls 12 of tent 6. Said adhesive is also not sufficiently strong as to cause the cat's fur to become stuck against the inner walls 12 of tent 6.

When a cat uses the kitty litter tent of the preferred embodiment, several features act to automatically caause the cat's fur to receive a thin coating of cedar sawdust, which will act as a flea repellant even when the cat is away from the device. The sloping walls of the tent 6 tend to facilitate contact between the cat's fur and the inner walls 12 of tent 6. Also, since the tent 6 only has an opening at one end, contact between the cat's fur and the inner walls 12 of tent 6 is also facilitated because the cat will need to turn around within tent 6, after relieving itself, in order to exit tent 6.

Although the tent shape thus facilitates the application of the cedar sawdust to the cat's fur, it should not be regarded as absolutely essential. One could employ a version of the invention in which the pet toilet compartment has vertical walls, provided the width of the compartment was, although wide enough to accommodate the cat, sufficiently narrow that the cat would still tend to rub against the inner walls when the cat turns around before exiting from the compartment.

Although the preferred embodiment employs cardboard in the construction of the base 2, and a stiff paper in construction of the tent 6, other suitable lightweight and inexpensive materials could of course be used instead, such as suitable plastic, without departing from the substance of the invention.

Similarly, although the preferred embodiment employs cedar sawdust as the material for coating the inner walls 12 of tent 6 with an odor suppressing and flea repellant substance, other flea repellant and odor suppressing substances could be used instead. It is believed that cedar sawdust has an advantage over many artificial flea repellant and odor suppressing substances, from an environmental and animal health viewpoint, in that it is a natural substance.

The examples just given of possible deviations from the preferred embodiment, are to be understood as being only examples, and not an exhaustive enumeration, of many ways in which those familiar with the art may employ the invention in configurations other than the preferred embodiment, without departing from the substance of the invention. The essential principles of the invention are defined by the claims.

I claim:

1. Disposable pet sanitary station, for allowing a pet to deposit body wastes into litter located within said station, comprising:
   (a) a base;
   (b) a layer of animal litter located within said base;
   (c) a pet toilet compartment, attached to said base and having at least a major portion of said pet toilet compartment located above said base, said pet toilet compartment further comprising:
      (1) an opening in said pet toilet compartment, of size sufficient to allow ingress and egress of said pet;
      (2) folding and erection means, for allowing said pet toilet compartment to be folded flat onto the top of said base for transport, sale and storage, and for allowing said pet toilet compartment to be erected in an upright position above said base for use by said pet;
      (3) deodorizing and flea repellant means, located on the inner walls of said pet toilet compartment, for automatically applying a thin coating of a deodorizing and flea repellant substance to the surface of the body of said pet when said pet moves about within said pet toilet compartment.

2. Disposable pet sanitary station as in claim 1, wherein said base is of the form of a shallow box having a rectangular bottom with unequal dimensions and a principal longitudinal axis.

3. Disposable pet sanitary station as in claim 2, wherein said base is cardboard and said pet toilet compartment is made of a stiff paper.

4. Disposable pet sanitary station as in claim 3, wherein said opening in said pet toilet compartment is at one end of said pet toilet compartment.

5. Disposable pet sanitary station as in claims 2, 3, or 4, wherein said pet toilet compartment is in the form of a tent having a principal longitudinal axis parallel to said principal longitudinal axis of said base, said tent having a conventional tent shape with a cross section, in a plane perpendicular to said principal longitudinal axis of said tent, of the form of an inverted "V".

6. Disposable pet sanitary station as in claim 3 or 4, wherein said folding and erection means comprises pre-creased fold lines in the walls of said pet toilet compartment, and a handle on the top of said pet toilet compartment.

7. Disposable pet sanitary station as in any of claims 1 through 4, wherein said deodorizing and flea repellant means comprises a thin layer of an adhesive substance on the inner walls of said pet toilet compartment, and a thin layer of a deodorizing and flea repellant substance on the surface of said layer of adhesive substance, and where said adhesive substance is sufficiently strong to hold said layer of deodorizing and flea repellant on said inner walls of said pet toilet compartment, but is not such a strong adhesive as to cause the surface of the body of said pet to become stuck against said inner walls of said pet toilet compartment, and where said adhesive is not such a strong adhesive as to prevent a portion of said deodorizing and flea repellant substance from being rubbed off onto the surface of the body of said pet when said pet rubs against said inner walls of said pet toilet compartment.

8. Disposable pet sanitary station as in claim 7, wherein said deodorizing and flea repellant substance is cedar sawdust.

9. Disposable pet sanitary station as in claim 7, wherein said deodorizing and flea repellant means further comprises a tent shape for said pet toilet compartment, and where said tent shape has an interior width which, although wide enough to allow said pet to move within said pet toilet compartment, is sufficiently narrow to facilitate contact between the surface of the body of said pet and said inner walls of said pet toilet compartment.

10. Disposable pet sanitary station as in claim 9, wherein said deodorizing and flea repellant means further comprises means for causing said pet to turn around before exiting said pet toilet compartment, so as to further facilitate contact between said body of said pet and said inner walls of said pet toilet compartment.

11. Disposable pet sanitary station as in claim 10, wherein said pet toilet compartment is of the form of a tent having a length substantially greater than the width of said tent, having ends which are the shorter edges of said tent, wherein said means for causing the pet to turn comprises the provision of said opening in only one end of said pet toilet compartment.

* * * * *